US011453388B2

(12) United States Patent
Kang (10) Patent No.: US 11,453,388 B2
(45) Date of Patent: Sep. 27, 2022

(54) PARKING ALIGNMENT ADJUSTMENT APPARATUS AND METHOD

(71) Applicant: MANDO MOBILITY SOLUTIONS CORPORATION, Gyeonggi-do (KR)

(72) Inventor: Tae Seok Kang, Gyeonggi-do (KR)

(73) Assignee: MANDO MOBILITY SOLUTIONS CORPORATION, Gyeonggi-Do (KR)

( * ) Notice: Subject to any disclaimer, the term of this patent is extended or adjusted under 35 U.S.C. 154(b) by 250 days.

(21) Appl. No.: 16/881,715

(22) Filed: May 22, 2020

(65) Prior Publication Data

US 2021/0024056 A1 Jan. 28, 2021

(30) Foreign Application Priority Data

Jul. 22, 2019 (KR) .......................... 10-2019-0088264

(51) Int. Cl.
*B60W 30/06* (2006.01)
*B60W 50/08* (2020.01)
(Continued)

(52) U.S. Cl.
CPC .......... *B60W 30/06* (2013.01); *B60W 50/087* (2013.01); *G01S 13/867* (2013.01);
(Continued)

(58) Field of Classification Search
CPC ... B60W 30/06; B60W 50/087; G01S 13/867; G01S 13/931; G01S 2013/9324; G01S 2013/9314
See application file for complete search history.

(56) References Cited

U.S. PATENT DOCUMENTS 6,650,999 B1 * 11/2003 Brust .................... G01S 5/0045
340/988
8,948,990 B2 * 2/2015 Kobayashi ......... B62D 15/0285
340/932.2
(Continued)

FOREIGN PATENT DOCUMENTS

JP       2006-298227    11/2006
KR   10-2008-0109871    12/2008
(Continued)

OTHER PUBLICATIONS

Office Action dated Nov. 17, 2020 for Korean Patent Application No. 10-2019-0088264 and its English machine translation by Google Translate.

*Primary Examiner* — Nay Tun
(74) *Attorney, Agent, or Firm* — Ladas & Parry, LLP (57) ABSTRACT

Disclosed are a parking alignment adjustment apparatus and method. The parking alignment adjustment apparatus comprises a first sensor configured to sense driving information of a host vehicle, a second sensor configured to sense surrounding environment information of the host vehicle, and a control unit. In this case, the control unit is configured to receive the driving information and the surrounding environment information from the first sensor and the second sensor, configured to determine whether the host vehicle is being parked on the basis of the received driving information, configured to calculate a target parking position on the basis of the received surrounding environment information when the host vehicle is being parked, configured to compare a current parking position to the target parking position and determine whether it is possible to improve parking alignment after the host vehicle is parked by a driver, configured to show, to the driver, that the improvement of the parking alignment is possible when it is possible to improve parking alignment, and configured to control the (Continued)

host vehicle such that the host vehicle is parked at the target parking position when a parking alignment improvement command is entered by the driver.

16 Claims, 8 Drawing Sheets

(51) Int. Cl.
  *G01S 13/86* (2006.01)
  *G01S 13/931* (2020.01)
(52) U.S. Cl.
  CPC ..... *G01S 13/931* (2013.01); *G01S 2013/9314* (2013.01); *G01S 2013/9324* (2020.01)

(56) References Cited

U.S. PATENT DOCUMENTS

| | | | | |
|---|---|---|---|---|
| 8,970,398 | B2* | 3/2015 | Michiguchi | B60W 30/18036 |
| | | | | 701/1 |
| 9,321,485 | B2* | 4/2016 | Park | B62D 15/0285 |
| 9,771,069 | B2* | 9/2017 | Gebert | B60W 30/06 |
| 2004/0249564 | A1* | 12/2004 | Iwakiri | B62D 15/027 |
| | | | | 340/932.2 |
| 2009/0123028 | A1* | 5/2009 | Satonaka | G01S 15/86 |
| | | | | 382/106 |
| 2009/0251334 | A1* | 10/2009 | Yoshihashi | B60W 50/14 |
| | | | | 340/932.2 |
| 2009/0303080 | A1* | 12/2009 | Kadowaki | B62D 15/028 |
| | | | | 340/932.2 |
| 2013/0116879 | A1* | 5/2013 | Huger | B62D 15/0285 |
| | | | | 701/23 |
| 2015/0364043 | A1* | 12/2015 | Lee | G06V 20/586 |
| | | | | 348/118 |
| 2016/0159397 | A1* | 6/2016 | Baek | B60W 30/06 |
| | | | | 701/41 |
| 2016/0318551 | A1* | 11/2016 | Terkes | B62D 15/028 |
| 2018/0009477 | A1* | 1/2018 | Pla Rubio | B62D 15/0285 |
| 2018/0105167 | A1* | 4/2018 | Kim | B60W 50/085 |
| 2018/0162384 | A1* | 6/2018 | Kim | B62D 15/0285 |
| 2019/0027042 | A1* | 1/2019 | Fujishima | G08G 1/168 |

FOREIGN PATENT DOCUMENTS

| | | | |
|---|---|---|---|
| KR | 10-2010-0064439 | | 6/2010 |
| KR | 10-2013-0017564 | | 2/2013 |
| KR | 2013017564 A | * | 2/2013 |
| KR | 10-2015-0142364 | | 12/2015 |
| KR | 10-2018-0066612 | | 6/2018 |

* cited by examiner

PARKING ALIGNMENT ADJUSTMENT APPARATUS AND METHOD

CROSS-REFERENCE TO RELATED APPLICATION

This application claims priority to and the benefit of Korean Patent Application No. 10-2019-0088264, filed on Jul. 22, 2019, the disclosure of which is incorporated herein by reference in its entirety.

BACKGROUND

1. Field of the Invention

The present invention relates to a parking alignment adjustment apparatus and method, and more particularly, to a parking alignment adjustment apparatus and method capable of additionally adjusting a parking position of a host vehicle after the host vehicle is parked by a driver.

2. Discussion of Related Art

In recent years, various driver assistance systems have been introduced. As one of the systems, an automatic parking assistance system that assists in parking or exiting is increasingly used. Such automatic parking assistance systems are called Smart Parking Assisting System (SPAS), Intelligent Parking Assist System (IPAS), Advanced Parking Guidance System (APGS), and the like.

However, conventional automatic parking assistance systems have a complicated operation procedure and require some learning for the driver to conveniently use the system. In addition, the conventional automatic parking assistance systems have a problem in terms of parking space search performance due to limitations of sensors required for space search. That is, automatic parking may not be supported even though a driver judges that parking space is sufficient. Accordingly, the automatic parking assistance system is often regarded as an unnecessary function.

Meanwhile, when a driver parks by him or herself, the parking is done in consideration of a distance from another vehicle, an alignment angle, and the like. Even when the driver is skillful, final parking alignment may vary every time depending on the conditions of a parking space (the size of the parking space, ambient illuminance, the conditions of other vehicles, and the like), the driver's concentration, and the like. When a parking state is not satisfactory, some drivers may alight from their vehicles and then get in their vehicles to adjust the parking state. Also, parking completion with bad parking alignment may cause inconvenience when other vehicles are leaving or being parked.

In order to solve the above problems, it is required to develop a driver convenience function, thus improving final parking completeness by controlling the alignment of a host vehicle in a parking space according to a driver's selection after the driver completes parking.

SUMMARY OF THE INVENTION

The present invention is directed to providing a parking alignment adjustment apparatus and method capable of improving parking completeness by adjusting the alignment of a host vehicle in a parking space according to a driver's selection after the host vehicle is preferentially parked by the driver.

According to an aspect of the present invention, there is provided a parking alignment adjustment apparatus comprising a first sensor configured to sense driving information of a host vehicle, a second sensor configured to sense surrounding environment information of the host vehicle, and a control unit configured to receive the driving information and the surrounding environment information from the first sensor and the second sensor, configured to determine whether the host vehicle is being parked on the basis of the received driving information, configured to calculate a target parking position on the basis of the received surrounding environment information when the host vehicle is being parked, configured to compare a current parking position to the target parking position and determine whether it is possible to improve parking alignment after the host vehicle is parked by a driver, configured to show, to the driver, that the improvement of the parking alignment is possible when it is possible to improve the parking alignment, and configured to control the host vehicle such that the host vehicle is parked at the target parking position when a parking alignment improvement command is entered by the driver.

Also, the first sensor may include one or more of a steering angle sensor, a speed sensor, a yaw sensor, a gear shift detection sensor, an ultrasonic sensor, or an image sensor of the host vehicle.

Also, the second sensor may include one or both of an ultrasonic sensor and an image sensor.

Also, when it is determined that the host vehicle is being parked, the control unit may calculate the target parking position on the basis of the received surrounding environment information, and the control unit may continuously calculate the target parking position until the host vehicle is parked by the driver.

Also, when calculating the target parking position, the control unit may calculate a route for reaching the target parking position in addition to the target parking position.

Also, the control unit may compare the current parking position to the target parking position after the host vehicle is parked by the driver, and the control unit may determine that it is possible to improve the parking alignment when there is a difference between the current parking position and the target parking position and the route for reaching the target parking position is present.

Also, the target parking position may include a relative angle between the host vehicle and a nearby object, a transverse position of the host vehicle, and a longitudinal position of the host vehicle.

According to another aspect of the present invention, there is provided a parking alignment adjustment method comprising sensing a driving information of a host vehicle; determining whether the host vehicle is being parked on the basis of the sensed driving information; sensing a surrounding environment information of the host vehicle; and controlling the host vehicle on the basis of the sensed surrounding environment information.

Also, controlling the host vehicle may comprise calculating a target parking position on the basis of the sensed surrounding environment information; determining whether to improve parking alignment by comparing a current parking position to the target parking position after the host vehicle is parked by a driver; showing, to the driver, that it is possible to improve the parking alignment when the improvement of the parking alignment is possible; and controlling the host vehicle such that the host vehicle is parked at the target parking position when a parking alignment improvement command is entered by the driver.

Also, calculating the target parking position may include calculating continuously the target parking position until the host vehicle is parked by the driver.

Also, calculating the target parking position may include calculating a route for reaching the parking target position in addition to the parking target position.

Also, determining whether to improve parking alignment may include comparing the current parking position to the target parking position after the host vehicle is parked by the driver, and determining that it is possible to improve the parking alignment when there is a difference between the current parking position and the target parking position and the route for reaching the target parking position is present.

Also, the target parking position may include a relative angle between the host vehicle and a nearby object, a transverse position of the host vehicle, and a longitudinal position of the host vehicle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings so that those skilled in the art can easily carry out the embodiments. The exemplary embodiments may, however, be embodied in many different forms and should not be construed as being limited to the embodiments set forth herein. In the accompanying drawings, portions irrelevant to the description of the present invention will be omitted for clarity. Moreover, like reference numerals refer to like elements throughout.

It should be further understood that the terms "comprises," "comprising," "includes," "including," and/or "having," when used in this specification, specify the presence of stated features, integers, steps, operations, elements, components, or groups thereof, but do not preclude the presence or addition of one or more other features, integers, steps, operations, elements, components, or groups thereof.

Figure 1:
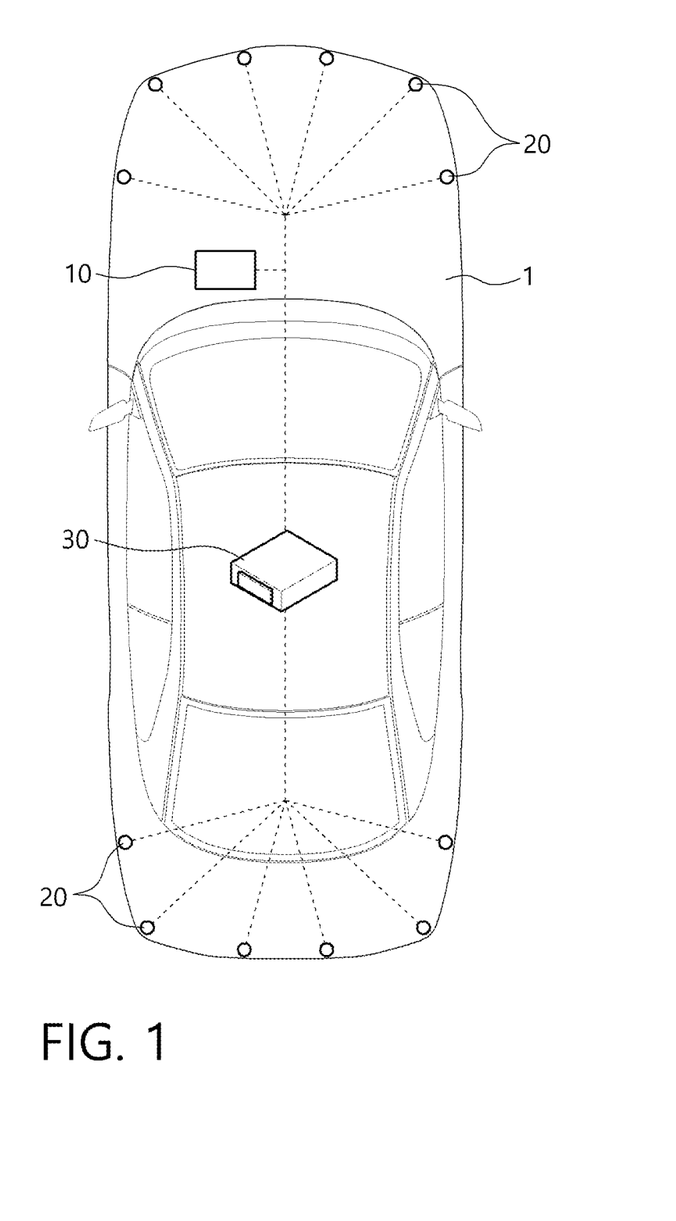
FIG. 1 is a block diagram of a parking alignment adjustment apparatus according to an embodiment of the present invention.

FIG. 1 is a block diagram of a parking alignment adjustment apparatus according to an embodiment of the present invention.

The parking alignment adjustment apparatus according to an embodiment of the present invention adjusts the alignment of a host vehicle in a parking space according to a driver's selection after the parking of the host vehicle is preferentially completed by the driver. That is, the parking alignment adjustment apparatus according to an embodiment of the present invention improves parking completeness by additionally performing automatic parking alignment according to a driver's selection after parking is preferentially done by the driver.

Referring to FIG. 1, the parking alignment adjustment apparatus according to an embodiment of the present invention is installed in a host vehicle 1. In detail, the parking alignment adjustment apparatus according to an embodiment of the present invention comprises a first sensor 10, a second sensor 20, and a control unit 30.

The first sensor 10 senses driving information of the host vehicle 1. The first sensor 10 is installed in the host vehicle 1 to sense the driving information. In an embodiment of the present invention, the driving information is used as a basis for determining whether the host vehicle 1 is performing parking.

For example, the driving information may include one or more of a steering angle, a vehicle speed, a change in vehicle heading, a gear shift, or a distance. In order to sense such information, the first sensor 10 may include one or more of a steering angle sensor, a speed sensor, a yaw sensor, a gear shift detection sensor, or an ultrasonic sensor.

Also, the first sensor 10 may include an image sensor. In this case, the driving information includes an image of surroundings of the host vehicle 1, and whether a parking space is present in the image may be a basis for determining whether to park.

Also, the first sensor 10 may include a navigation device. In other words, the presence or absence of a parking space in a guidance area of the navigation device may be used as a basis for determining whether the host vehicle 1 is performing parking.

The second sensor 20 senses surrounding environment information of the host vehicle 1. The second sensor 20 is installed in the host vehicle 1 to sense the surrounding environment information. In an embodiment of the present invention, the surrounding environment information becomes a basis for calculating an optimal target parking position when the host vehicle 1 is performing parking.

For example, the surrounding environment information may be information such as an obstacle near the host vehicle 1, a distance between the host vehicle 1 and an obstacle, a parking line, and the like. In order to sense such information, the second sensor 20 may include one or both of an ultrasonic sensor and an image sensor.

The control unit 30 may be installed in the host vehicle 1 to control the host vehicle 1. The control unit 30 determines whether the host vehicle 1 is performing parking on the basis of the driving information sensed by the first sensor 10 and the surrounding environmental information sensed by the second sensor 20 and controls the host vehicle 1 in order to improve parking alignment under certain conditions.

In an embodiment of the present invention, the control unit 30 may be an electronic control unit (ECU) installed in the host vehicle 1. In detail, the control unit 30 may be included in a main ECU installed in the host vehicle 1 and may also be provided as an ECU separate from the main ECU.

The control unit 30 may receive the driving information and the surrounding environment information from the first sensor 10 and the second sensor 20. As described above, the driving information may include one or more of a steering angle, a vehicle speed, a change in vehicle heading, a gear shift, or a distance from an obstacle with respect to the host vehicle 1. Also, the surrounding environment information may include a distance between the host vehicle 1 and an obstacle, a parking line, and the like.

The control unit 30 determines whether a host vehicle is being parked on the basis of the received driving information. For example, the control unit 30 may determine whether the host vehicle 1 is performing parking in consideration of vehicle deceleration, the degree of change in steering angle or direction, the presence or absence of shifting forward or backward, the presence or absence of a parking space near the host vehicle 1, and the like.

When it is determined that the host vehicle 1 is performing parking, the control unit 30 calculates a target parking position on the basis of the received surrounding environment information. When it is determined that the host vehicle 1 is performing parking, the control unit 30 may continuously calculate a target parking position on the basis of the received surrounding environment information until the host vehicle is parked by the driver.

Also, when the target parking position is being calculated, the control unit 30 may calculate a route for reaching the target parking position in addition to the target parking position. The calculated route may be data for determining whether it is possible to improve parking alignment.

In an embodiment of the present invention, the target parking position may include a relative angle between the host vehicle and a nearby object, a transverse position of the host vehicle, and a longitudinal position of the host vehicle. Here, the transverse position of the host vehicle refers to a position above which any axis (e.g., a front or rear wheel axis) transversely passing through the host vehicle should be placed, and the longitudinal position of the host vehicle refers to a position above which any axis (e.g., a longitudinal axis passing through the center) longitudinally passing through the host vehicle should be placed. The relative angle, the transverse position of the host vehicle, and the longitudinal position of the host vehicle may be determined in various ways.

For example, in perpendicular parking, the relative angle may be determined through alignment with an angle between the host vehicle 1 and an object in a parking space, and the transverse position and the longitudinal position may be determined through alignment with a relative position of an object in a parking space. When the target parking position is continuously calculated until parking is completed by the driver, the longitudinal position may be determined to be a current position where the host vehicle is parked by the driver.

Also, in parallel parking, the relative angle and the transverse position may be determined through alignment with an angle of a curb or another vehicle parked in front of or behind of the host vehicle, and the longitudinal position may be determined through alignment with the half point of the distance from another vehicle parked in front of or behind the host vehicle 1. When another vehicle is only in front of or behind the host vehicle 1, the longitudinal position may be determined through alignment with a point spaced an appropriate distance from the vehicle parked in front or behind.

When the host vehicle 1 is parked by the driver, the control unit 30 compares a current parking position to the target parking position to determine whether to improve parking alignment. For example, after the host vehicle 1 is parked by the driver, the control unit 30 compares a current parking position to the target parking position. When there is a difference therebetween and a route from the current parking position to the target parking position is present, the control unit 30 may determine that it is possible to improve the parking alignment.

When it is possible to improve the parking alignment, the control unit 30 shows, to the driver, that the parking alignment can be improved. The method of showing that the parking alignment can be improved may be performed in various ways. For example, information may be provided through a human-machine interface (HMI), such as a display, installed in the host vehicle 1.

When a parking alignment improvement command is entered by the driver, the control unit 30 controls the host vehicle such that the host vehicle is parked at the target parking position. When the parking alignment improvement command is entered, the control unit 30 automatically controls the speed, gear, and the like of the host vehicle such that the host vehicle 1 reaches the target parking position.

Meanwhile, the parking alignment improvement command may be entered through an HMI, such as a touch screen, a button, or a knob, which is installed in the host vehicle 1. Also, the driver may enter the parking alignment improvement command after alighting off the host vehicle 1. In this case, a remote controller, a smart key, etc. may be used as an interface for performing the parking alignment improvement command.

Figure 2:
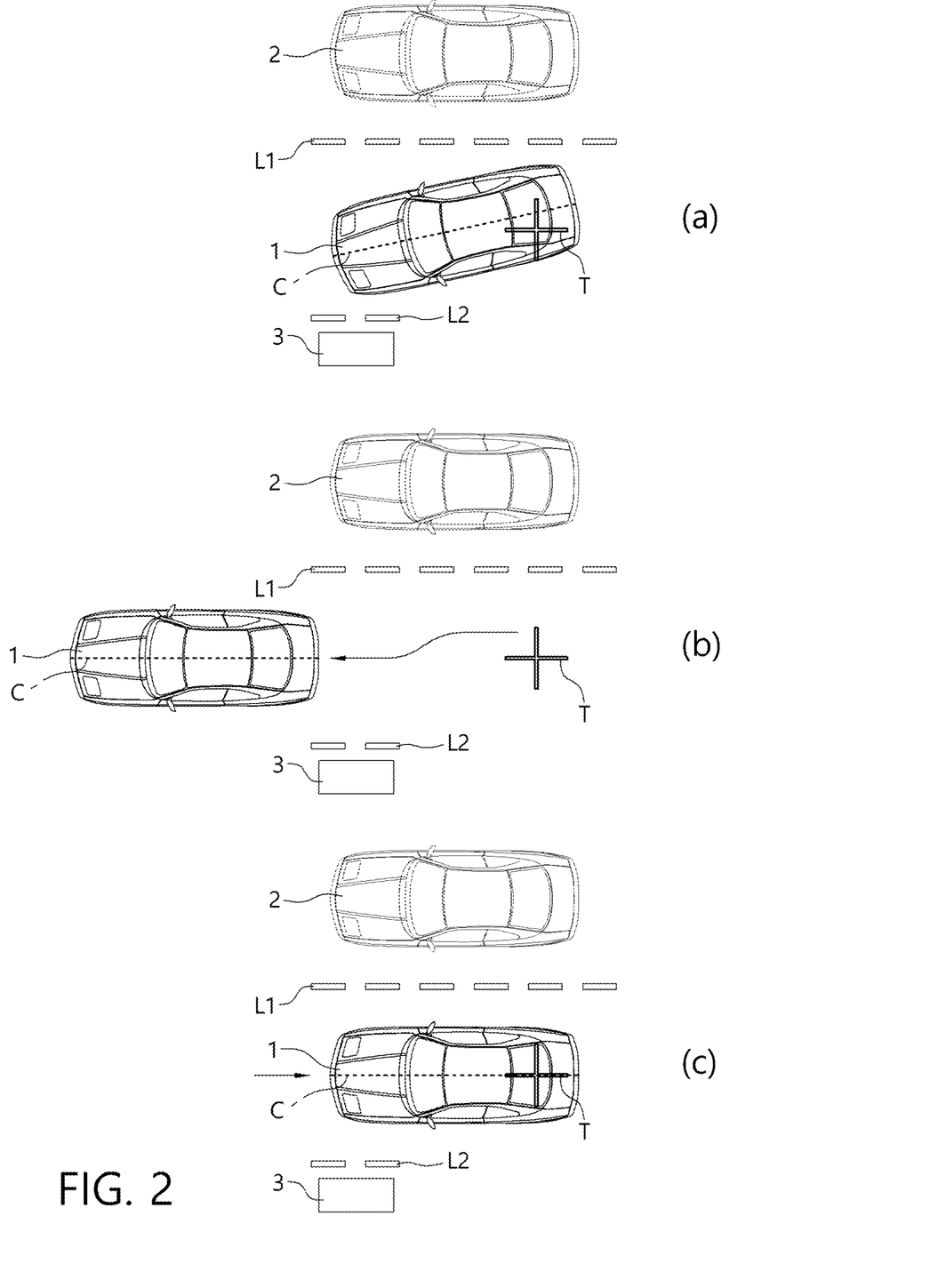
FIGS. 2 and 3 are views illustrating an example in which the parking alignment adjustment apparatus according to an embodiment of the present invention improves parking alignment in perpendicular parking.
Figure 3:
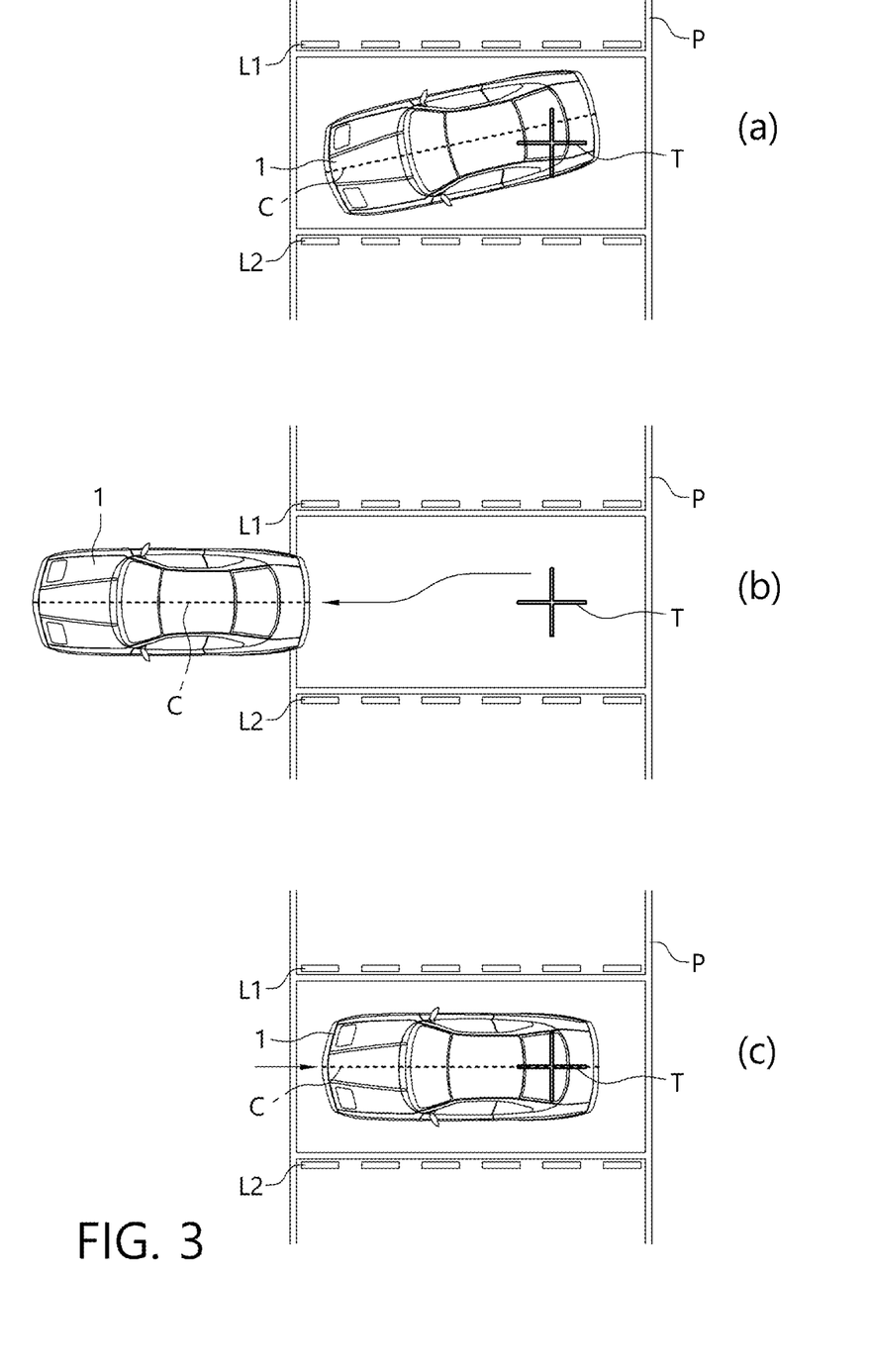

FIGS. 2 and 3 are views illustrating an example in which the parking alignment adjustment apparatus according to an embodiment of the present invention improves parking alignment in perpendicular parking. In detail, FIG. 2 shows that perpendicular parking is done in a situation in which there is no parking line, and FIG. 3 shows that perpendicular parking is done in a situation in which there is a parking line.

In FIG. 2, a target parking position T is determined on the basis of a third-party vehicle 2 present on the right side of the host vehicle 1 and an obstacle 3 present on the left side of the host vehicle 1. In detail, the transverse position and the relative angle of the target parking position T of the host vehicle 1 are aligned with a virtual right reference line L1 parallel to the third-party vehicle 2 and present between the third-party vehicle 2 and the right side of the host vehicle 1 and a virtual left reference line L2 parallel to the obstacle 3 and present between the obstacle 3 and the left side of the host vehicle 1. Meanwhile, the longitudinal position of the target parking position T is aligned with a point where the host vehicle 1 is preferentially parked by the driver.

When the host vehicle 1 is parked by the driver as shown in FIG. 2A, the control unit 30 determines that a current parking position is different from the target parking position T and also that it is possible to improve parking alignment on the basis of an angle between the target parking position T and a vehicular longitudinal axis C and then shows the determination result.

When the parking alignment improvement command is entered by the driver, the control unit 30 automatically controls the host vehicle 1 such that the host vehicle 1 reaches the target parking position T as shown in FIGS. 2B and 2C.

In FIG. 3, the target parking position T is determined on the basis of a parking line P. In detail, a virtual right reference line L1 and a virtual left reference line L2 are set on parking lines P present on the right and left sides of the host vehicle 1, and the transverse position and the relative angle of the target parking position T of the host vehicle 1 are determined through alignment with the virtual right reference line L1 and the virtual left reference line L2. Meanwhile, the longitudinal position of the target parking position T is determined through alignment with a point where the host vehicle 1 is preferentially parked by the driver.

When the host vehicle 1 is parked by the driver as shown in FIG. 3A, the control unit 30 determines that a current parking position is different from the target parking position T and also that it is possible to improve parking alignment on the basis of an angle between the target parking position T and the vehicular longitudinal axis C and then shows the determination result. When the parking alignment improvement command is entered by the driver, the control unit 30 automatically controls the host vehicle 1 such that the host vehicle 1 reaches the target parking position T as shown in FIGS. 3B and 3C.

Figure 4:
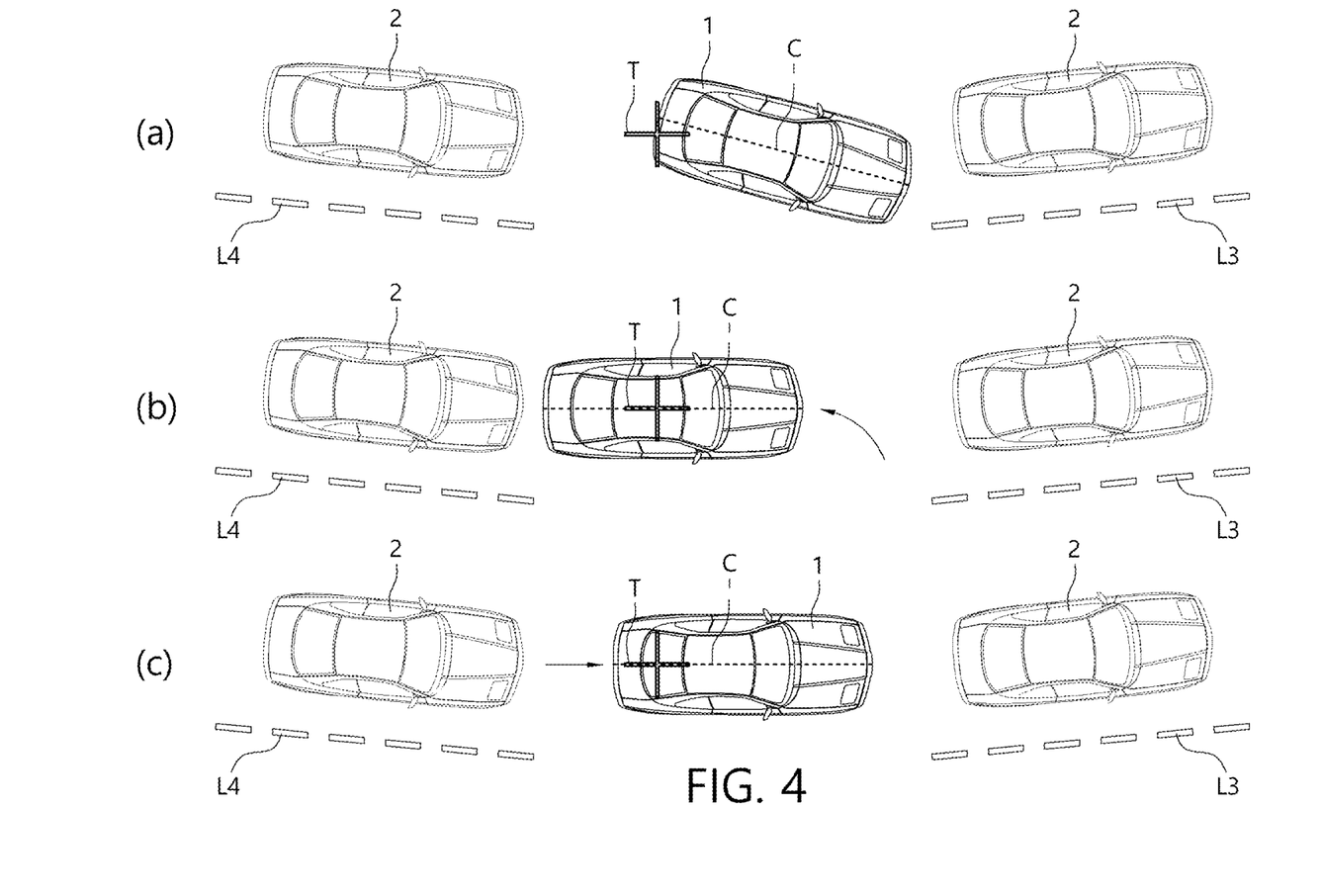
FIGS. 4 and 5 are views illustrating an example in which the parking alignment adjustment apparatus according to an embodiment of the present invention improves parking alignment in parallel parking.
Figure 5:
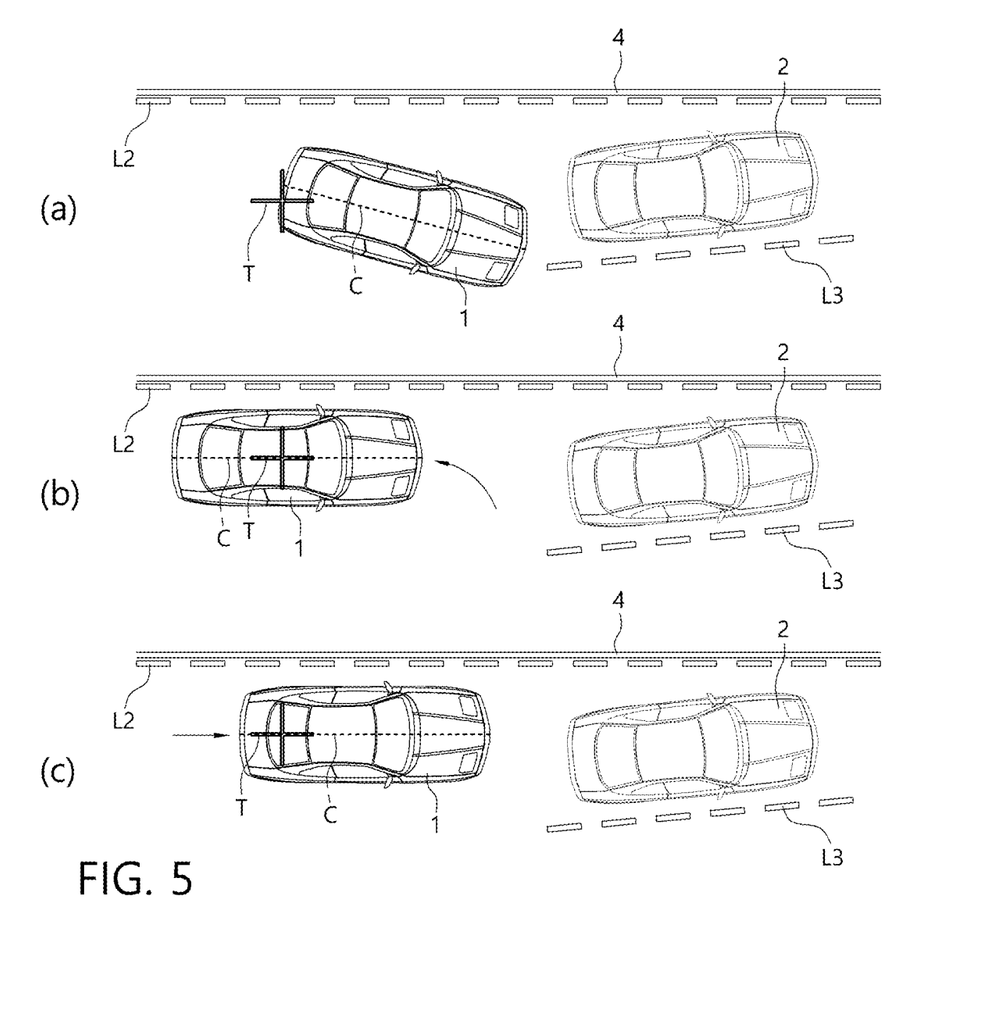

FIGS. 4 and 5 are views illustrating an example in which the parking alignment adjustment apparatus according to an embodiment of the present invention performs parking alignment adjustment in parallel parking.

In FIG. 4, the target parking position T is determined on the basis of the third-party vehicle 2 present in front of or behind the host vehicle 1. In detail, the relative angle, the transverse position, and the longitudinal position of the target parking position T of the host vehicle 1 are determined through alignment with a virtual front reference line L3 present parallel to the right side of the third-party vehicle 2 parked in front of the host vehicle 1 and a virtual rear reference line L4 present parallel to the right side of the third-party vehicle 2 parked behind the host vehicle 1.

When the host vehicle 1 is parked by the driver as shown in FIG. 4A, the control unit 30 determines that a current parking position is different from the target parking position T and also that it is possible to improve parking alignment on the basis of an angle between the target parking position T and the vehicular longitudinal axis C and then shows the determination result. When the parking alignment improvement command is entered by the driver, the control unit 30 automatically controls the host vehicle 1 such that the host vehicle 1 reaches the target parking position T as shown in FIGS. 4B and 4C.

In FIG. 5, the target parking position T is determined on the basis of the third-party vehicle 2 present in front of the host vehicle 1 and a curb 4 present on the left side of the host vehicle 1. In detail, the relative angle, the transverse position, and the longitudinal position of the target parking position T of the host vehicle 1 are determined through alignment with a virtual front reference line L3 present parallel to the right side of the third-party vehicle 2 parked in front of the host vehicle 1 and a virtual left reference line L2 present parallel to the curb 4 present on the left side of the host vehicle 1.

When the host vehicle 1 is parked by the driver as shown in FIG. 5A, the control unit 30 determines that a current parking position is different from the target parking position T and also that it is possible to improve parking alignment on the basis of an angle between the target parking position T and the vehicular longitudinal axis C and then shows the determination result. When the parking alignment improvement command is entered by the driver, the control unit 30 automatically controls the host vehicle 1 such that the host vehicle 1 reaches the target parking position T as shown in FIGS. 5B and 5C.

Figure 6:
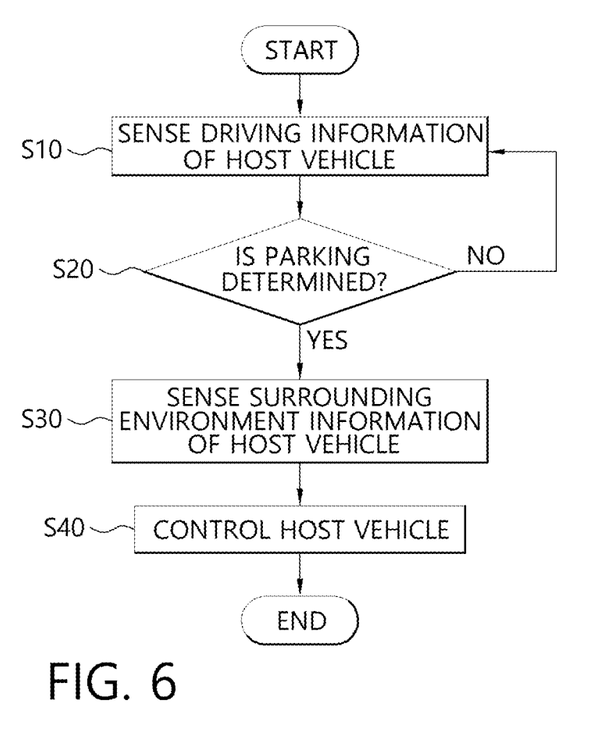
FIG. 6 is a flowchart of a parking alignment adjustment method according to an embodiment of the present invention.

FIG. 6 is a flowchart of a parking alignment adjustment method according to an embodiment of the present invention.

The parking alignment adjustment method according to an embodiment of the present invention is for adjusting the alignment of a host vehicle in a parking space according to a driver's selection after the host vehicle is preferentially parked by the driver. The parking alignment adjustment method according to an embodiment of the present invention may be performed by the above-described parking alignment adjustment apparatus according to an embodiment of the present invention.

Referring to FIG. 6, the parking alignment adjustment method according to an embodiment of the present invention comprises a first sensing step S10, a parking determination step S20, a second sensing step S30, and a control step S40.

The first sensing step S10 is a step of sensing driving information of a host vehicle. The first sensing step S10 may be achieved by a first sensor 10. The driving information is used as a basis for determining whether a host vehicle 1 is performing parking. The driving information may include one or more of a steering angle, a vehicle speed, a change in vehicle heading, a gear shift, or a distance between a host vehicle 1 and a nearby object. Also, the driving information may include images.

The parking determination step S20 is a step of determining whether the host vehicle 1 is being parked on the basis of the sensed driving information. The parking determination step S20 may be achieved by the control unit 30. For example, the control unit 30 may determine whether the host vehicle 1 is performing parking in consideration of vehicle deceleration, the degree of change in steering angle or direction, the presence or absence of shifting forward or backward, the presence or absence of a parking space near the host vehicle 1, and the like.

The second sensing step S30 is a step of sensing surrounding environment information of the host vehicle 1. The second sensing step S30 may be performed by a second sensor 20. The surrounding environment information is a basis for calculating an optimal target parking position when the host vehicle 1 is performing parking. In detail, the surrounding environment information may be information such as an object near the host vehicle 1, a distance between the host vehicle 1 and an object, a parking line, and the like.

The control step S40 is a step of controlling the host vehicle 1 on the basis of the sensed surrounding environment information. The control step S40 may be performed by the control unit 30.

Figure 7:
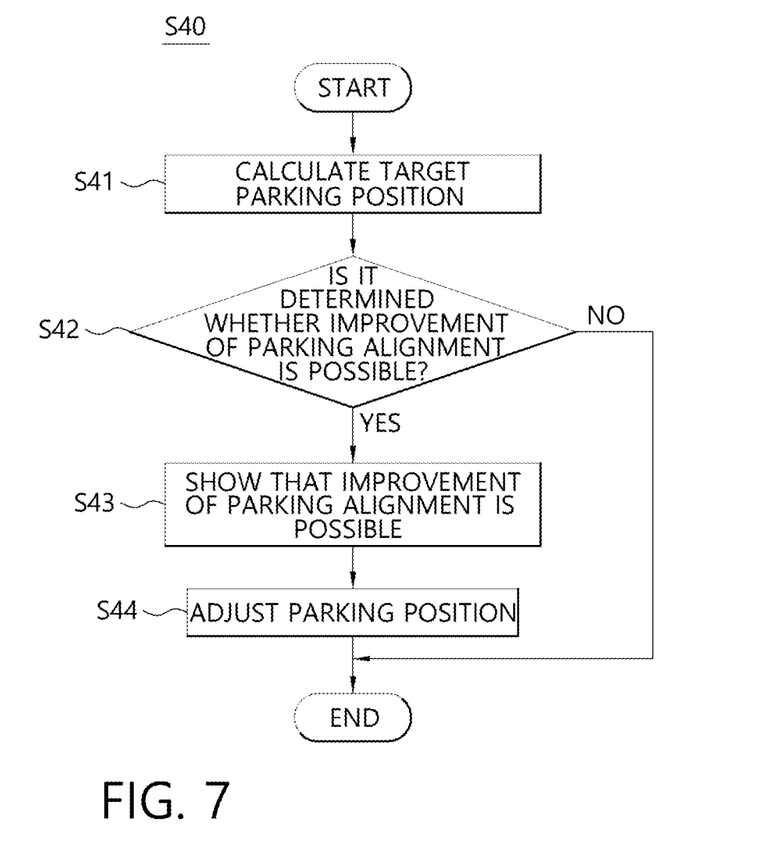
FIG. 7 is a detailed flowchart of a control step of the parking alignment adjustment method according to an embodiment of the present invention.

Referring to FIG. 7, according to an embodiment of the present invention, the control step S40 includes a calculation step S41 for calculating a target parking position T on the basis of the sensed surrounding environment information, a determination step S42 for determining whether to improve parking alignment by comparing a current parking position to the target parking position T after the host vehicle is parked by the driver, a display step S43 for showing, to the driver, that it is possible to improve the parking alignment when the improvement of the parking alignment is possible, and an adjustment step S44 for controlling the host vehicle such that the host vehicle is parked at the target parking position T when a parking alignment improvement command is entered by the driver.

In the calculation step S41, the control unit 30 may continuously calculate the target parking position T until the host vehicle is parked by the driver. In this case, the control unit 30 may also calculate a route for reaching the target parking position T in addition to the target parking position T.

As described above, in an embodiment of the present invention, the target parking position T may include a relative angle between the host vehicle and a nearby object, a transverse position of the host vehicle, and a longitudinal position of the host vehicle. In this case, the relative angle, the transverse position, and the longitudinal position may be determined in various ways.

In the determination step S42, after the host vehicle 1 is parked by the driver, the control unit 30 compares a current parking position to the target parking position T. When there is a difference therebetween and a route from the current parking position to the target parking position T is present, the control unit 30 may determine that it is possible to improve the parking alignment.

In the display step S43, when it is possible to improve the parking alignment, the control unit 30 shows, to the driver, that the parking alignment can be improved. The method of showing that the parking alignment can be improved may be performed in various ways. For example, information may be provided through an HMI, such as a display, installed in the host vehicle 1.

In the adjustment step S44, when a parking alignment improvement command is entered by the driver, the control unit 30 controls the host vehicle such that the host vehicle is parked at the target parking position.

Figure 8:
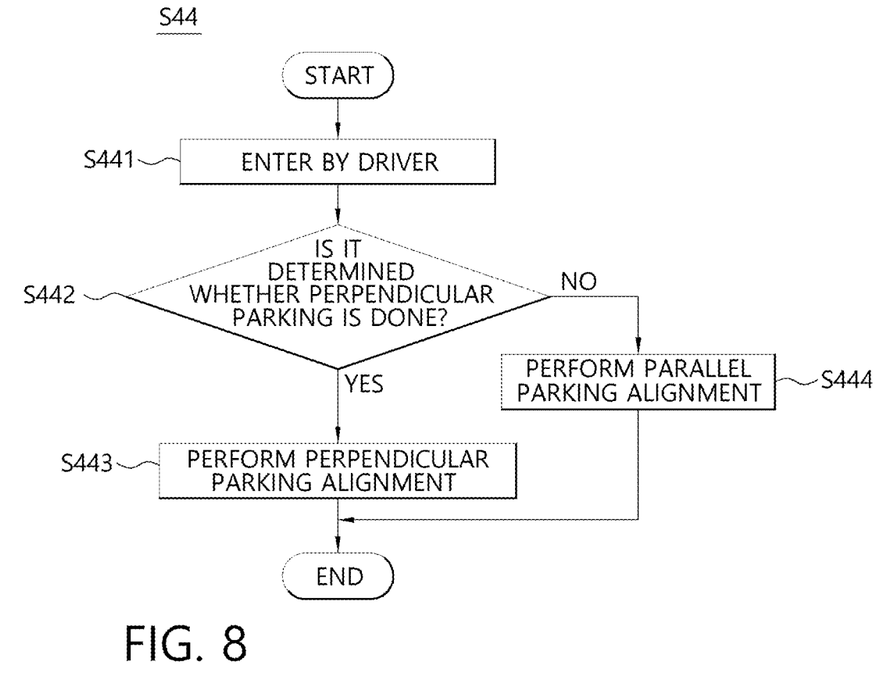
FIG. 8 is a detailed flowchart of an adjustment step in the control step of the parking alignment adjustment method according to an embodiment of the present invention.

FIG. 8 shows a detailed flowchart of the adjustment step in the control step of the parking alignment adjustment method according to an embodiment of the present invention.

Referring to FIG. 8, the adjustment step S44 may start from a step of entering the parking alignment improvement command by the driver (S441). The parking alignment improvement command may be entered through an HMI, such as a touch screen, a button, or a knob, which is installed in the host vehicle 1. Also, the driver may enter the parking alignment improvement command after alighting off the host vehicle 1. In this case, a remote controller, a smart key, etc. may be used as an interface for performing the parking alignment improvement command.

Also, when the parking alignment improvement command is entered, the control unit 30 may automatically control the speed, gear, and the like of the host vehicle 1 such that the host vehicle 1 reaches the target parking position. To this end, the adjustment step S44 may include a step of determining whether perpendicular parking is performed (S442) and a step of performing perpendicular parking alignment (S443) or a step of performing parallel parking alignment (S444).

As described above with reference to FIGS. 2 to 5, the target parking position T and the route for reaching the target parking position T may be set a bit differently depending on whether perpendicular parking or parallel parking is performed. Thus, detailed control of the host vehicle 1 may vary.

Accordingly, when it is determined, in the step of determining whether perpendicular parking is performed (S442), that perpendicular parking is performed, the step of performing perpendicular parking alignment (S443) is performed, but the step of performing parallel parking alignment (S444) is not performed. On the other hand, when it is determined, in the step of determining whether perpendicular parking is performed (S442), that perpendicular parking is not performed, the step of performing parallel parking alignment (S444) is performed, but the step of performing perpendicular parking alignment (S443) is not performed.

In an embodiment of the present invention, the adjustment step S44 may further include a step of re-determining whether it is possible to improve parking alignment after the step of performing perpendicular parking alignment (S443) or the step of performing parallel parking alignment (S444). That is, the control unit 30 may re-determine whether the host vehicle 1 is placed at the target parking position T after improving the parking alignment of the host vehicle 1.

When the re-determination result is that the parking alignment can be further improved, that is, when the host vehicle 1 does not reach the target parking position T, the procedure may be performed recursively after returning to the step of determining whether perpendicular parking is performed (S442).

According to embodiments of the present invention, when a position at which a host vehicle is parked by a driver is different from a target parking position calculated by a control unit, the control unit may automatically control the host vehicle to move the position of the host vehicle to the target parking position, and thus it is possible to optimize the parking position of the host vehicle in a parking space.

While embodiments of the present invention have been described above, the scope of the present invention is not limited to the disclosed embodiments. Those skilled in the art of the present invention can readily suggest another embodiment by adding, modifying, deleting, or adding components without departing from the scope of the present invention, but the suggested embodiment is construed as being within the scope of the present invention.

What is claimed is:

1. A parking alignment adjustment apparatus comprising:
a first sensor configured to sense driving information of a host vehicle;
a second sensor configured to sense surrounding environment information of the host vehicle; and
a control unit configured to:
receive the driving information and the surrounding environment information from the first sensor and the second sensor;
determine whether the host vehicle is being parked on the basis of the received driving information;
calculate a target parking position including a relative angle between the host vehicle and a nearby object, a transverse relative position of the host vehicle with respect to the nearby object and a longitudinal relative position of the host vehicle with respect to the nearby object, on the basis of the received surrounding environment information when the host vehicle is being parked;
compare a current parking position to the target parking position and determine whether it is possible to improve parking alignment after the host vehicle is parked by a driver;
show, to the driver, that the improvement of the parking alignment is possible when it is possible to improve the parking alignment; and
control the host vehicle such that the host vehicle is parked at the target parking position when a parking alignment improvement command is entered by the driver.

2. The parking alignment adjustment apparatus of claim 1, wherein the first sensor includes one or more of a steering angle sensor, a speed sensor, a yaw sensor, a gear shift detection sensor, an ultrasonic sensor, or an image sensor of the host vehicle.

3. The parking alignment adjustment apparatus of claim 1, wherein the second sensor includes one or both of an ultrasonic sensor and an image sensor.

4. The parking alignment adjustment apparatus of claim 1, wherein when it is determined that the host vehicle is being parked, the control unit calculates the target parking position on the basis of the received surrounding environment information, and the control unit continuously calculates the target parking position until the host vehicle is parked by the driver.

5. The parking alignment adjustment apparatus of claim 1, wherein when calculating the target parking position, the control unit calculates a route for reaching the target parking position in addition to the target parking position.

6. The parking alignment adjustment apparatus of claim 5, wherein the control unit compares the current parking position to the target parking position after the host vehicle is parked by the driver, and the control unit determines that it is possible to improve the parking alignment when there is a difference between the current parking position and the target parking position and the route for reaching the target parking position is present.

7. The parking alignment adjustment apparatus of claim 1, wherein, in perpendicular parking, the relative angle between the host vehicle and the nearby object is determined through alignment with an angle between the host vehicle and the nearby object, and the transverse relative position and the longitudinal relative position of the host vehicle are determined through alignment with a relative position of the nearby object.

8. The parking alignment adjustment apparatus of claim 1, wherein, in parallel parking, the relative angle between the host vehicle and the nearby object and the transverse relative position of the host vehicle are determined through alignment with an angle of a curb or another vehicle parked in front of or behind of the host vehicle, and the longitudinal relative position of the host vehicle is determined through alignment with a half point of a distance from the another vehicle parked in front of or behind the host vehicle, or, when the another vehicle is parked only in front of or behind the host vehicle, through alignment with a point spaced a predetermined distance from the another vehicle parked in front or behind.

9. The parking alignment adjustment apparatus of claim 1, wherein the target parking position is determined through alignment with at least one of a virtual right reference line, a virtual left reference line, a virtual front reference line and a virtual rear reference line.

10. A parking alignment adjustment method, the method comprising:
sensing a driving information of a host vehicle;
determining whether the host vehicle is being parked on the basis of the sensed driving information;
sensing a surrounding environment information of the host vehicle; and
controlling the host vehicle on the basis of the sensed surrounding environment information, wherein the controlling of the host vehicle comprises:
calculating a target parking position including a relative angle between the host vehicle and a nearby object, a transverse relative position of the host vehicle with respect to the nearby object and a longitudinal relative position of the host vehicle with respect to the nearby object, on the basis of the sensed surrounding environment information;
determining whether to improve parking alignment by comparing a current parking position to the target parking position after the host vehicle is parked by a driver;
showing, to the driver, that it is possible to improve the parking alignment when the improvement of the parking alignment is possible; and
controlling the host vehicle such that the host vehicle is parked at the target parking position when a parking alignment improvement command is entered by the driver.

11. The parking alignment adjustment method of claim 10, wherein the calculating of the target parking position includes calculating continuously the target parking position until the host vehicle is parked by the driver.

12. The parking alignment adjustment method of claim 11, wherein the calculating of the target parking position includes calculating a route for reaching the parking target position in addition to the parking target position.

13. The parking alignment adjustment method of claim 12, wherein the determining of whether to improve parking alignment includes comparing the current parking position to the target parking position after the host vehicle is parked by the driver, and determining that it is possible to improve the parking alignment when there is a difference between the current parking position and the target parking position and the route for reaching the target parking position is present.

14. The parking alignment adjustment method of claim 10, wherein, in perpendicular parking, the relative angle between the host vehicle and the nearby object is determined through alignment with an angle between the host vehicle and the nearby object, and the transverse relative position and the longitudinal relative position of the host vehicle are determined through alignment with a relative position of the nearby object.

15. The parking alignment adjustment method of claim 10, wherein, in parallel parking, the relative angle between the host vehicle and the nearby object and the transverse relative position of the host vehicle are determined through alignment with an angle of a curb or another vehicle parked in front of or behind of the host vehicle, and the longitudinal relative position of the host vehicle is determined through alignment with a half point of a distance from the another vehicle parked in front of or behind the host vehicle, or, when the another vehicle is parked only in front of or behind the host vehicle, through alignment with a point spaced a predetermined distance from the another vehicle parked in front or behind.

16. The parking alignment adjustment method of claim 10, wherein the target parking position is determined through alignment with at least one of a virtual right reference line, a virtual left reference line, a virtual front reference line and a virtual rear reference line.

* * * * *